(12) United States Patent
Lin et al.

(10) Patent No.: US 8,614,694 B2
(45) Date of Patent: Dec. 24, 2013

(54) TOUCH SCREEN SYSTEM BASED ON IMAGE RECOGNITION

(75) Inventors: Bo-Ching Lin, Taipei Hsien (TW); Ping Yu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 600 days.

(21) Appl. No.: 12/886,586

(22) Filed: Sep. 21, 2010

(65) Prior Publication Data

US 2011/0261013 A1 Oct. 27, 2011

(30) Foreign Application Priority Data

Apr. 26, 2010 (CN) .......................... 2010 1 0155855

(51) Int. Cl.
*G06F 3/042* (2006.01)
*G06T 13/00* (2011.01)

(52) U.S. Cl.
USPC ........................................ 345/175; 345/474

(58) Field of Classification Search
USPC ......... 345/175, 178, 545, 173, 174, 148, 474, 345/204
See application file for complete search history.

(56) References Cited

U.S. PATENT DOCUMENTS

| 2009/0027357 A1 | 1/2009 | Morrison | |
|---|---|---|---|
| 2010/0151946 A1* | 6/2010 | Wilson et al. | 463/36 |
| 2010/0245287 A1* | 9/2010 | Thorn | 345/175 |

FOREIGN PATENT DOCUMENTS

| CN | 101206547 A | 6/2008 |
|---|---|---|
| CN | 101364159 A | 2/2009 |

* cited by examiner

*Primary Examiner* — Michael Faragalla
(74) *Attorney, Agent, or Firm* — Altis & Wispro Law Group, Inc.

(57) ABSTRACT

A touch screen system includes a touch screen corresponding to a Descartes coordinate system XOY, a first image capturing unit, a second capturing unit, and a processing unit. The first image capturing unit and the second capturing unit are arranged at the periphery of the touch screen and are substantially perpendicular to each other. Both the two image capturing units include a camera and a housing, the camera is housed in the housing to take images, an optical axis of the lens of each camera is perpendicular to X or Y axis of the system XOY respectively for acquiring images including one touch point. The processing unit identifies a touched point on the touch screen and determines X and Y coordinates of the touched point in the system XOY and executing a function corresponding to the X and Y coordinates of the touched point.

10 Claims, 4 Drawing Sheets

TOUCH SCREEN SYSTEM BASED ON IMAGE RECOGNITION

BACKGROUND

1. Technical Field

The present disclosure relates to touch screen systems and, particularly, to a touch screen system based on image recognition.

2. Description of Related Art

Generally, there are three types of touch panels, the resistance film type, the surface ultrasonic wave type, and the electrostatic capacity type. However, the conventional touch panels are easily affected by ambient environment, thus the recognition precision may be decreased after repeated use.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
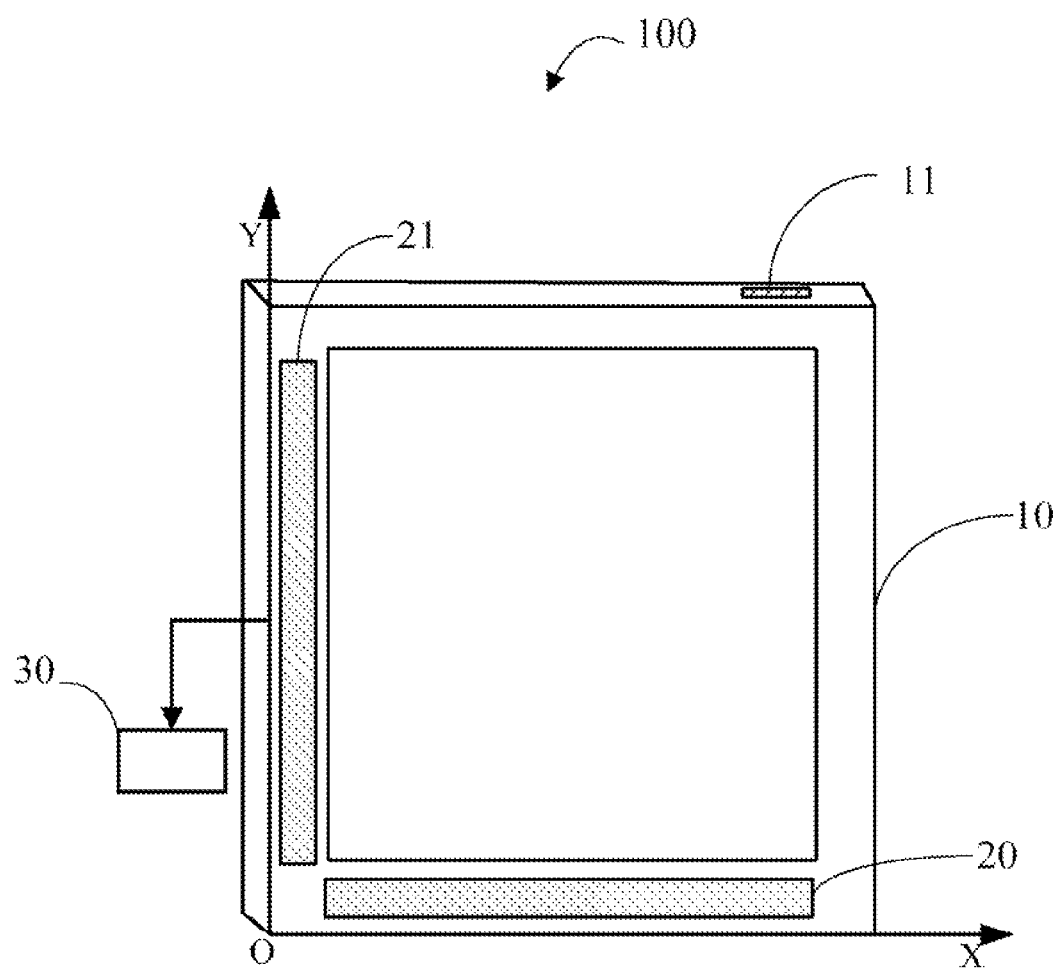
FIG. 1 is a schematic view of a touch screen system based on image recognition in accordance with an exemplary embodiment.

Referring to FIG. 1, a touch screen system 100 includes a touch screen 10, a first image capturing unit 20, a second image capturing unit 21, and a processing unit 30. In this embodiment, the first image capturing unit 20 and the second image capturing unit 21 are respectively arranged at two adjacent sides of the touch screen 10, and are substantially perpendicular to each other. The touch screen 10 corresponds to a Descartes coordinate system XOY, the first image capturing unit 20 is located on or parallel to the X axis of the system XOY, the second image capturing unit 21 is located on or parallel to the Y axis of the system XOY. The first image capturing unit 20 captures images of the touch screen 10 along the Y axis for purpose of determining an X coordinate value of a touched point on the touch screen 10. The second image capturing unit 21 captures images of the touch screen along the X axis for purpose of determining a Y coordinate value of a touched point on the touch screen 10. The first image capturing unit 20 and the second image capturing unit 21 are electrically connected to the processing unit 30. The processing unit 30 controls the first image capturing unit 20 and the second image capturing unit 21 to capture images, determines the coordinates of the touched points in the system XOY and a touch track according to the captured images, and executes functions corresponding to the touched points and the touch track.

Figure 2:
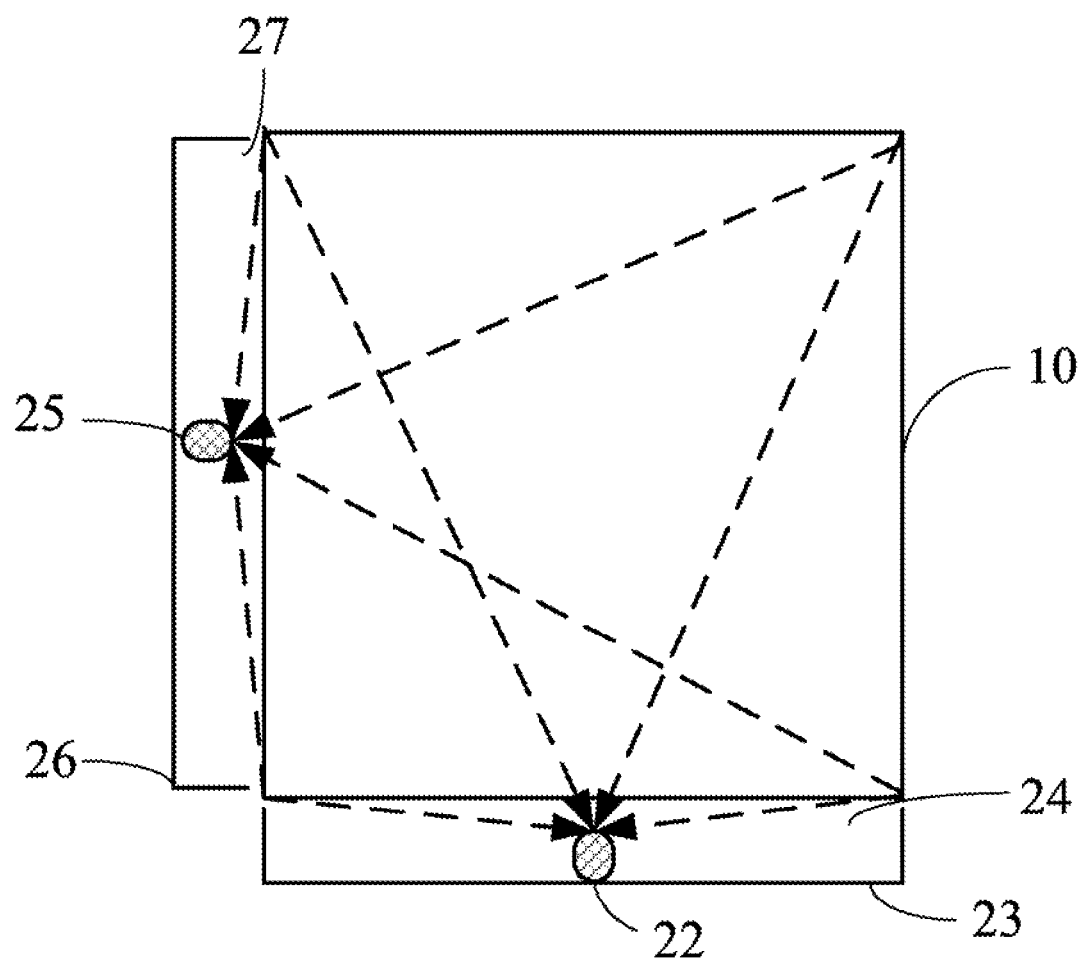
FIG. 2 is a schematic view of image capturing units of the touch screen system of FIG. 1.

Referring to FIG. 2, the first image capturing unit 20 includes a camera 22 and a housing 23. The camera 22 is mounted in the housing 23 and is exposed through a through hole 24 defined in the housing 23. The optical axis of the lens of the camera 22 is substantially perpendicular to the X axis of the system XOY, and the touch screen 10 is located on the optical axis of the lens of the camera 22. With such a configuration, the touch screen 10 is presented as a line in each of the images taken by the first image capturing unit 21 and the projection of each touched point on the touch screen 10 is mapped to a point on the line. In this embodiment, the through hole 24 is bar-shaped for enlarging the viewing scope of the camera 22. The camera 22 includes a wide-angle lens whose shooting scope reaches about 180 degrees. The structure of the second image capturing unit 21 is the same as that of the first image capturing unit 20. The second image capturing unit 21 includes a camera 25, a housing 26, and a through hole 27, the optical axis of the lens of the camera 25 is substantially perpendicular to the X axis of the system XOY and the touch screen 10 is located on the optical axis of the lens of the camera 25. With such a configuration, the touch screen 10 is presented as a line in each of the images taken by the second image capturing unit 21 and the projection of each touched point on the touch screen 10 is mapped to a point on the line.

Figure 3A:
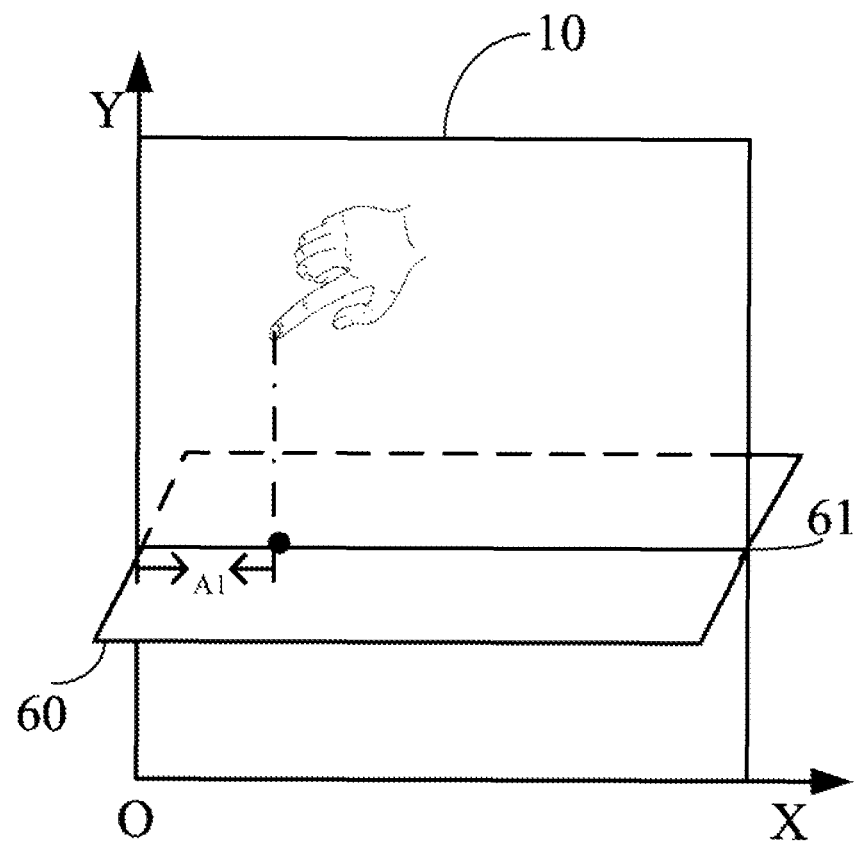
FIGS. 3A-3B are schematic views employed to illustrate a touch recognition method of the touch screen system of FIG. 1.
Figure 3B:
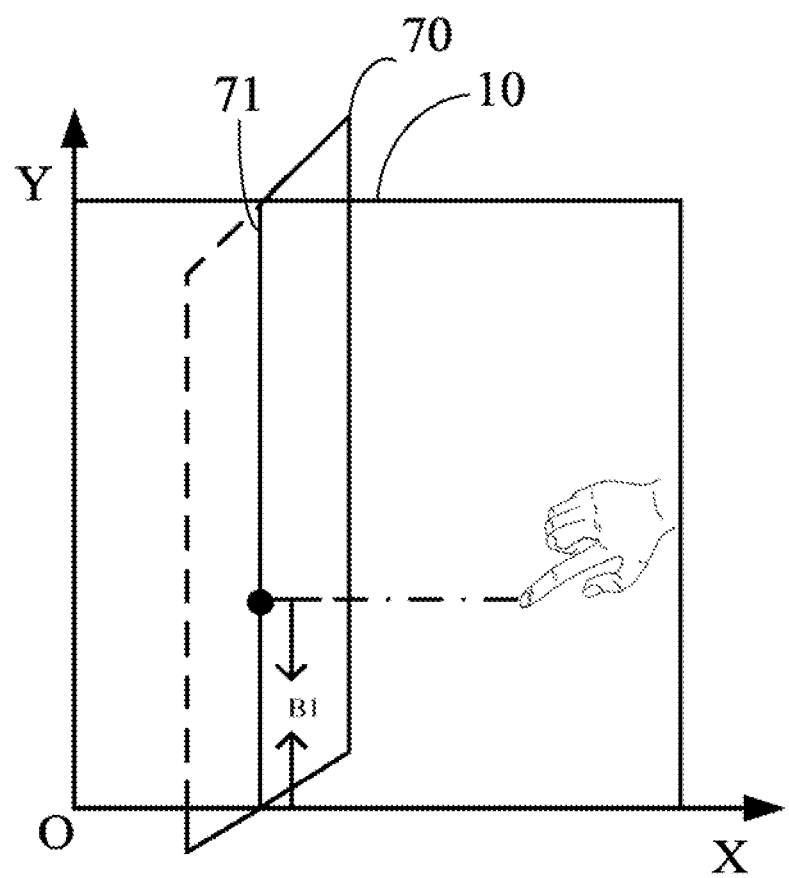

Referring to FIGS. 3A-3B, in one embodiment, the first image capturing unit 20 and the second image capturing unit 21 are two-dimensional image capturing units. The processing unit 30 pre-stores two images of the touch screen 10 respectively captured by the first image capturing unit 20 and the second image capturing unit 21. The processing unit 30 analyzes the pre-stored image identifies the location of the touch screen (i.e., the lines) in the pre-stored image. In addition, defines the X coordinates of a number of points on the line in the pre-stored image taken by the first image capturing unit 20 corresponding to the X coordinates of pixels on the touch screen 10. Moreover, defines the Y coordinates of a number of points on the line in the pre-stored image taken by the second capturing unit 21 corresponding to the Y coordinates of pixels on the touch screen 10.

In use, the first image capturing unit 20 and the second image capturing unit 21 takes two images 60 and 70 of the touch screen 10 and transmits the images 60 and 70 to the processing unit 30. The processing unit 30 compares the images 60 and 70 with the pre-stored images correspondingly and determines whether projections of a touch exist on the lines 61 and 71 in the images 60 and 70. Generally, if a point on the screen 10 is touched, the touch is reflected in the images 60 and 70. If projections of a touch exist, the processing unit 30 further determines the locations of the projections on the lines 61 and 71 correspondingly based on the comparison of the captured images 60 and 70 with the pre-stored images. That is, the processing unit 30 determines the points on the lines 61 and 71 overlapping the projections, and determines the locations of the projections on the lines 61 and 71 according to the points overlapping the projections. The processing unit 30 thus obtains the X and Y coordinates A1 and B1 of the touch on the touch screen 10 because the points overlapping the projections on the lines 61 and 71 respectively correspond to the X and Y coordinates A1 and B1 of the touch on the touch screen 10.

Based on a number of touches on the touch screen 10 and the time sequence of the touches, the processing unit 30 further determines the touch track of the touches on the touch screen 10 and carries out functions corresponding to the touch track.

In other embodiments, the first image capturing unit 20 and the second image capturing unit 21 are one-dimensional image capturing units, each image captured by the two one-dimensional image capturing units is a line. The processing unit 30 pre-stores two images of the touch screen 10 respectively captured by the first image capturing unit 20 and the second image capturing unit 21. Similarly, to the first embodiment, the processing unit 30 analyzes the pre-stored images.

In addition, defines the X coordinates of a number of points on the pre-stored line taken by the first image capturing unit 20 corresponding to the X coordinates of pixels on the touch screen 10. Moreover, defines the Y coordinates of a number of points on the pre-stored line taken by the second image capturing unit 21 corresponding to the Y coordinates of pixels on the touch screen 10.

If users touch a point on the touch screen 10, the touch is reflected in the lines. The processing unit 30 further determines the locations of the projections of a touch on the lines correspondingly based on the comparison of the captured lines with the pre-stored images. The processing unit 30 thus obtains the X and Y coordinates of the touch on the touch screen 10 because the points overlapping the projections on the lines respectively correspond to the X and Y coordinates of the touch on the touch screen 10.

The processing unit 30 further powers the touch screen 10 on/off, as well as the first image capturing unit 20 and the second image capturing unit 21 according to signals from a button 11.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A touch screen system, comprising:
 a touch screen corresponding to a Descartes coordinate system XOY;
 a first image capturing unit and a second image capturing unit arranged at two adjacent sides of the touch screen correspondingly and substantially perpendicular to each other, wherein the first image capturing unit comprises a first housing and a first camera housed in the first housing, an optical axis of the lens of the first camera is substantially perpendicular to the X axis of the coordinate system, and the touch screen is located on the optical axis of the lens of the first camera, the first image capturing unit is configured to capture an image of the touch screen along the Y axis; the second image capturing unit comprises a second housing and a second camera housed in the second housing, an optical axis of the lens of the second camera is perpendicular to the Y axis, and the touch screen is located on the optical axis of the lens of the second camera, the second image capturing unit is configured to capture an image of the touch screen along the X axis, the first image capturing unit and the second image capturing unit are two-dimensional image capturing units; and
 a processing unit configured to pre-store two images of the touch screen respectively captured by the two-dimensional image capturing units and the two pre-stored images are references for determining the X and Y coordinates of the touched point, the processing unit further configured to identify a touched point on the touch screen and determine an X coordinate of the touched point in the system XOY according to the pre-stored image taken by the first image capturing unit, and a Y coordinate of the touch point in the system XOY according to the pre-stored image taken by the second image capturing unit, and executing a function corresponding to the X and Y coordinates of the touched point.

2. The touch screen system as described in claim 1, wherein the first housing and the second housing are bar-shaped for enlarging the angle of shooting.

3. The touch screen system as described in claim 1, wherein the lens of each of the first and second cameras is a wide-angle lens whose shooting scope reaches about 180 degrees.

4. The touch screen system as described in claim 1, wherein the first image capturing unit and the second image capturing unit are located on the X axis of the system XOY and the Y axis of the system XOY correspondingly.

5. The touch screen system as described in claim 1, wherein the first image capturing unit and the second image capturing unit are located parallel to the X axis of the system XOY and the Y axis of the system XOY correspondingly.

6. The touch screen system as described in claim 1, wherein the touch screen presents itself as a line in each of the images taken by the first image capturing unit and the second image capturing unit and the projection of each touched point on the touch screen is mapped to at least one point on the line.

7. The touch screen system as described in claim 1, wherein the processing unit is configured to analyze the location of the touch screen on the pre-stored images, and define the X coordinates and Y coordinates of a plurality of points on the lines in the pre-stored images corresponding to the X coordinates and Y coordinates of pixels of the touch screen.

8. The touch screen system as described in claim 7, wherein the processing unit is further configured to identify and determine the locations of projections of the touch point on the lines correspondingly based on the comparison of the images with the pre-stored images to obtain the X and Y coordinates of the touch point on the touch screen.

9. The touch screen system as described in claim 1, wherein the processing unit is further configured to determine a touch track according to time sequence of a plurality of touched points on the touch screen and execute a function corresponding to the touch track.

10. The touch screen system as described in claim 1, wherein the processing unit is further configured to power on/off the touch screen, the first image capturing unit and the second image capturing unit according to signals from a button installed on the touch screen system.

* * * * *